(12) United States Patent
McCann et al.

(10) Patent No.: US 11,910,302 B2
(45) Date of Patent: Feb. 20, 2024

(54) MULTI-BAND CHANNEL DISCOVERY FOR WLAN

(71) Applicant: BlackBerry Limited, Waterloo (CA)

(72) Inventors: Stephen McCann, Southampton (GB); Michael Peter Montemurro, Toronto (CA); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 18/194,742

(22) Filed: Apr. 3, 2023

(65) Prior Publication Data

US 2023/0254763 A1    Aug. 10, 2023

Related U.S. Application Data

(62) Division of application No. 17/110,793, filed on Dec. 3, 2020, now Pat. No. 11,647,449.

(30) Foreign Application Priority Data

Jan. 10, 2020 (EP) .................................... 20151223

(51) Int. Cl.
*H04W 48/16* (2009.01)
*H04W 24/10* (2009.01)
(Continued)

(52) U.S. Cl.
CPC ........... *H04W 48/16* (2013.01); *H04W 24/10* (2013.01); *H04W 72/0453* (2013.01);
(Continued)

(58) Field of Classification Search
CPC ......... H04W 72/1215; H04W 72/1242; H04W 76/20; H04W 80/06; H04W 88/00;
(Continued)

(56) References Cited

U.S. PATENT DOCUMENTS

2011/0026495 A1* 2/2011 Lee .................. H04L 5/0055
370/335
2014/0064247 A1* 3/2014 Teyeb ................ H04W 36/32
370/331
(Continued)

FOREIGN PATENT DOCUMENTS

CN    102598539 A    7/2012
CN    103582053 A    2/2014
(Continued)

OTHER PUBLICATIONS

European Patent Office, Extended European Search Report for Appl. No. 20151223.3 dated Jul. 17, 2020 (10 pages).
(Continued)

*Primary Examiner* — Joshua L Schwartz
(74) *Attorney, Agent, or Firm* — Trop Pruner & Hu, P.C.

(57) ABSTRACT

In some examples, in response to determining that a new communication channel is required, a wireless device retrieves information provided from a network node of availability of alternative communication channels for the wireless device. In response to retrieving information that a second communication channel is available for a location within which the wireless device is located, the wireless device removes wireless device specific information and initiates a request to connect to the second communication channel, where the second communication channel is in a frequency range different from a frequency range of the first communication channel.

20 Claims, 8 Drawing Sheets

(51) Int. Cl.
  *H04W 72/0453*  (2023.01)
  *H04W 74/08*    (2009.01)
  *H04W 72/542*   (2023.01)
  *H04W 84/12*    (2009.01)

(52) U.S. Cl.
  CPC ..... *H04W 72/542* (2023.01); *H04W 74/0808* (2013.01); *H04W 84/12* (2013.01)

(58) Field of Classification Search
  CPC . H04W 48/16; H04W 24/10; H04W 72/0453; H04W 72/085; H04W 74/0808; H04W 84/12; H04W 16/14; H04W 36/0016; H04W 36/0055; H04W 74/04
  See application file for complete search history.

(56) References Cited

U.S. PATENT DOCUMENTS

| | | | |
|---|---|---|---|
| 2014/0086208 A1 | 3/2014 | Murry et al. | |
| 2014/0269364 A1* | 9/2014 | Knapp | H04L 41/083 370/252 |
| 2015/0024798 A1 | 1/2015 | Lee et al. | |
| 2015/0319624 A1* | 11/2015 | Garcia | H04J 11/0069 370/329 |
| 2017/0118758 A1 | 4/2017 | Li | |
| 2018/0288622 A1* | 10/2018 | Maria | H04L 63/0853 |
| 2020/0112961 A1* | 4/2020 | Gupta | H04W 24/02 |

FOREIGN PATENT DOCUMENTS

| | | |
|---|---|---|
| CN | 106256146 A | 12/2016 |
| EP | 1486033 A1 | 12/2004 |
| EP | 2690905 A2 | 1/2014 |
| WO | 2014070100 A1 | 5/2014 |
| WO | 2015148038 A1 | 10/2015 |
| WO | WO-2015148038 A1 * | 10/2015 ............ H04W 24/02 |

OTHER PUBLICATIONS

European Patent Office, Communication pursuant to Article 94(3) EPC for Appl. No. 20151223.3 dated Feb. 15, 2023 (7 pages).
China National Intellectual Property Administration, First Review of the Opinion Circular for Appl. No. 202011332066.2 dated Jun. 27, 2023 (including translation) (24 pages).
China National Intellectual Property Administration, Office Action for Appl. No. 202011332066.2 dated Nov. 21, 2023 (10 pages).

* cited by examiner

MULTI-BAND CHANNEL DISCOVERY FOR WLAN

CROSS REFERENCE TO RELATED APPLICATIONS

This application is a divisional of U.S. application Ser. No. 17/110,793, filed Dec. 3, 2020, which claims the benefit of EP Appl. No. 20151223.3, filed Jan. 10, 2020, which are both hereby incorporated by reference in their entirety.

FIELD OF TECHNOLOGY

The present disclosure relates to wireless local area networks, WLANs, and more particularly to channel discovery and selection in a WLAN environment.

BACKGROUND

Wireless LAN (WLAN) technology relates to wireless computer networks that link two or more devices using wireless communication to form a local area network (LAN). They are typically used within limited geographical areas and facilitate wireless devices having access to a network as they move about within the coverage of the WLAN. The underpinning technologies that support WLANs are based on IEEE 802.11 standards and many are colloquially referred to as Wi-Fi networks. A wireless device typically connects to the WLAN through an access point. That access point may itself provide a gateway or alternatively use another device as a gateway to enable a user to access the Internet or an intranet (e.g. a closed Enterprise network)

The IEEE 802.11 standards are part of the IEEE 802 set of LAN protocols, and specify the set of media access control (MAC) and physical layer (PHY) protocols for implementing WLAN/Wi-Fi communications in various frequencies, including but not limited to 2.4 GHz, 5 GHz, 6 GHz and 60 GHz frequency bands. Within each of these frequency bands a user can typically select a channel—which is a specific frequency range within the overall band. For example, when operating in the 2.4 GHz band, each channel is 20 MHz wide. The channel centers are separated by 5 MHz, and within a single regulatory domain, which is defined for a specific geography, the entire spectrum may be only 100 MHz wide. Different domains may well have different allocations within the overall spectrum. Using the example of North America which allocates 11 channels within the 2.4 GHz band, the 11 channels of the 2.4 GHz band have to squeeze into the 100 MHz available, with the result that there is at least a potential for overlap. Where multiple Wi-Fi devices are connected to the WLAN on the same channel there are potential problems of interference with a resultant degradation in performance.

IEEE 802.11 Task Groups continuously work to enhance the IEEE Std. 802.11 physical layers (PHY) and Medium Access Control Layer (MAC) in the 2.4 GHz, 5 GHz, 6 GHz and 60 GHz bands, with a focus on:
  Improving spectrum efficiency and area throughput
  Improving real world performance in indoor and outdoor deployments in the presence of interfering sources, dense heterogeneous networks in moderate to heavy user loaded APs.

The intent of this continuous activity is to produce the next generation of high-speed WLAN equipment, following the existing IEEE 802.11ac products in the market.

Despite these continuous improvements in the standards with the increasing numbers of wireless devices trying to access what are defined bands in available frequency ranges, there are needs for alternative solutions to enable a wireless device to access a wireless network.

SUMMARY

Accordingly, there is provided methods implemented at each of wireless devices and network nodes and a network node as detailed in the claims that follow. Wireless devices and network nodes that are configured to effect the corresponding methods may also be provided. Computer programs which are configured to execute the methods are also provided.

BRIEF DESCRIPTION OF THE DRAWINGS

Examples of the present disclosure will now be described with reference to the attached figures, in which.

DETAILED DESCRIPTION

Figure 1:
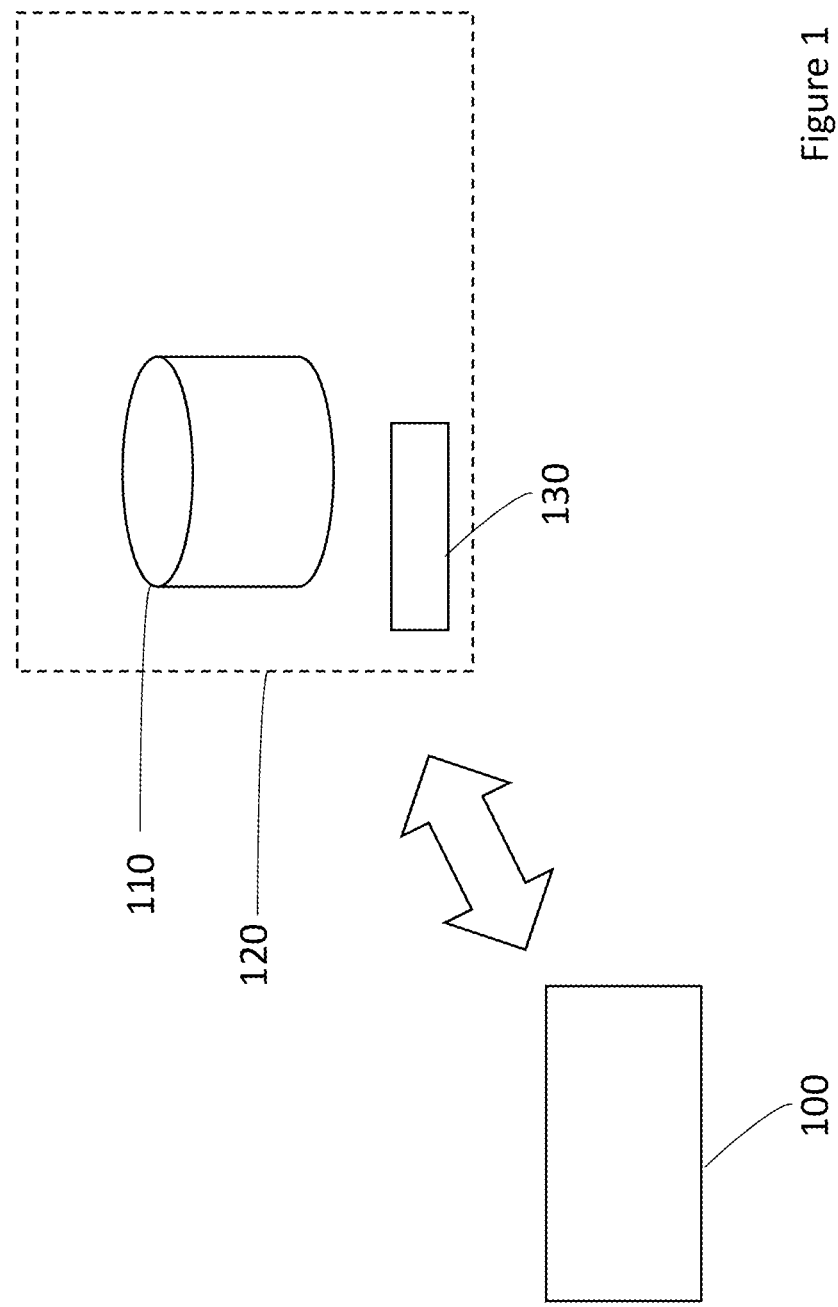
FIG. 1 is network schematic of an architecture that can be used in the context of the present teaching

The following describes methods of enabling wireless access devices access a wireless local area network. Within the context of the present teaching, a wireless device connected to a network using a first communication channel can query availability of alternative communication channels. On receiving confirmation that there is an available second communication channels available for the location within which the wireless device is located, the wireless device can then make a request to connect to the second communication channel. This request, if granted, will then allow the device to elect to switch from the first communication channel to the second communication channel or indeed to communicate on both the first and the second communication channels.

The determination of availability of a second communication channel is desirably made using a database look up query where the wireless devices location is inferred from the query and possible available second communication channels for that location are determined. On effecting determination that a second communication channel exists for the determined location, the identity of that second communication channel can be relayed back to the wireless device to enable the wireless device effect its request for connection.

The present teaching may be understood with reference to an exemplary arrangement, where the secondary communication channel is part of the 6 GHz license-exempt band, the primary communication channel being a different communication band to this 6 GHz band. Within the present specification the following acronyms and terminology may be used:

| Acronym/Abbreviation | Full text | Brief Description |
|---|---|---|
| AFC | Automated Frequency Coordination | |
| AN | Access Network | |
| ANQP | Access Network Query Protocol | IEEE 802.11 protocol allowing the transmission of access network information to a terminal, before associating to any network. |
| AP | Access Point | |
| GAS | Generic Advertisement Service | |
| LAN | Local Area Network | |
| MBC | Multi-band Channel | |
| MBCM | Multi-band Channel Map | The set of available multi-band channels |
| MBCQP | Multi-band Channel Query Protocol | |
| RLQP | Registered Location Query Protocol | IEEE 802.11 protocol allowing the transmission of location information for radio regulatory purposes between a master and client device. |
| RLSS | Registered Location Secure Server | |
| SSID | Service Set Identifier | |
| STA | Station | IEEE 802.11 terms for either a mobile device or an access point (AP) |
| WAN | Wireless Access Network | |
| WFA | Wi-Fi Alliance | |
| WLAN | Wireless Local Area Network | |
| WPM | WLAN pre-association message | |
| WSM | White Space Map | The set of (TV) white space channels |

| Term | Brief Description |
|---|---|
| Access Network | WLAN including the external network to which is it attached. |
| Client Device | A device that transmits channel requests to a database via a Master Device. It a can also receive broadcast messages from a Master Device |
| Database | Stored data in the memory of an entity in an unstructured format. |
| Element | Alternative term for an IEEE 802.11 frame. |
| Master Device | The device that receives messages over the air from a client device and forwards them to a database or server. This is usually an IEEE 802.11 access point. |
| Multi-band Channel Map | A data object containing multiple channel information covering multiple bands. |
| Unlicensed Device | Wireless radio that is license-exempt to transmit on a particular channel, or has regulatory permission to transmit in spectrum by a license-by-rule. The operator of the radio does not need to obtain a specific license to operate a transmitter at a particular site or for a particular channel. |

Within the context of using the 6 GHz band, the person of skill will appreciate that the existing regulatory environment already defines licensed use of some or all of this band and states that unlicensed devices would only be allowed to transmit under the control of an automated frequency control (AFC) system. Discovery of 6 GHz (for example 5.925-7.125 GHz or a subset range of frequencies) capable APs (i.e. device discovery of APs that can operate in the 6 GHz band) for IEEE 802.11 use is a complex issue due to the existing primary licensed users. The availability of channels will vary depending on the radio regulatory authority, the specific location and time of day. The band has access rules based on geography, so that a single scanning solution is difficult to implement. In addition, there are a lot of channels to scan so discovery can be time consuming.

Per the present teaching, to address this problem there is provided a multi-band channel (MBC) discovery mechanism which facilitates and enables a wireless device to access what are conventionally considered restricted frequency bands, such as the 6 GHz band, on a shared basis for potentially limited durations. By identifying a location of a querying wireless device, the present teaching provides via a database query, the available radio channels (e.g. 6 GHz band channels) that can be used on a secondary basis. Within the present context, the use on a secondary basis means sharing with other (primary) users of the band. New messages and protocols over the air interface are required, so that once the messages are received by the infrastructure (e.g. a master device or an AP), a database can be queried.

The database stores and provides data about which radio channels are available for the client device to use within the frequency band of interest (e.g. 6 GHz band), taking into account one or more existing primary incumbent users or usages, or the location and time or data of the requested transmission by the client device. Channel availability is then transmitted back to the client device by responding to a master device, or an access point (AP), either of which in turn forwards a response over the air interface to the client device.

The master device could also be quasi-mobile master device that operates in one geographic location for a period of time and then moves on (e.g. for a conference or an event). In one situation, the master device can cache responses for a certain period of time until the information from the database becomes stale. In other situations, the master device should not be capable of caching responses, so that the message flow can be end to end, so that a client device can determine the current set of available channels directly from the database.

The mechanism is extensible so that any band suitable for a client device can be considered, such as those proposed by the Wi-Fi Alliance Automated Frequency Coordination (AFC) program New messages and protocols include:
Extensions to existing messages and protocols
New Advertisement Protocol
Secured advertisement information
Multi-band channel update messages For the purposes of explanation, the following exemplary solutions concentrate on the IEEE 802.11 WLAN standards, but it will be appreciated that similar new messages can be created for other technologies such as those defined by 3GPP, IETF, ETSI and IEEE.

Solution #1: Extensions to Existing Message and Protocols

The present inventor has identified that it is possible to provide extensions to existing messages and protocols. By utilising these existing frameworks, it is possible to allow a client device to send queries to a channel database in the infrastructure to determine the availability of any channel across any medium (e.g. RF spectrum, wired, optical, magnetic, near field). The following describes two exemplary methods of doing this:

Enhancing the Existing IEEE 802.11af TV Whitespace Messages

In a first arrangement, IEEE 802.11 messages such as the Channel Availability Query (CAQ), the Channel Schedule Management (CSM), or the Network Channel Control (NCC), are enhanced to allow multi-band channel discovery (including 6 GHz).

The operation of the messages is as follows and can be understood with reference to the network architecture of FIG. 1.

A client device 100 can use the new messages to send a query to a database 110 in the network infrastructure 120. It will be appreciated that the client device is capable of communicating at least wirelessly with one or more remote entities. Example of such a client device include wireless communication devices such as telephones, smartphones, laptops, tablets, and the like. The database 110 can be centralised—per the example of FIG. 1, can be a local proxy or can be a distributed database (i.e. one that does not have a central coordination point). The queries request information about the availability and access rules (e.g. security) of channels. The queries can request information about a specific channel, a group of channels (a band or sub-band), or none at all in which case information about all channels is returned. The query is transported over an air interface (or wired) and then relayed to the database 110. The response, containing the required information (or an error code) is then transmitted back to the client device 100 over the same route (or possibly an alternate bearer, for example a response is broadcast to many client devices). It will be appreciated that the block schematic of this architecture may appear superficially similar to an architecture that can be used in the context of TV White Space allocation but, it is important to note that in the context of allocating new channels outside of a TV white space context—per the present teaching—this architecture is new.

A client device 100 may alternatively receive a new message from a database 110, without any query having been sent. The message can be broadcast by the database 110 (or by either a local master device or an access point, AP, 130) on a periodic basis (or when either a master device or an AP determines that enough demand of channel information requires a broadcast transmission).

Figure 2:
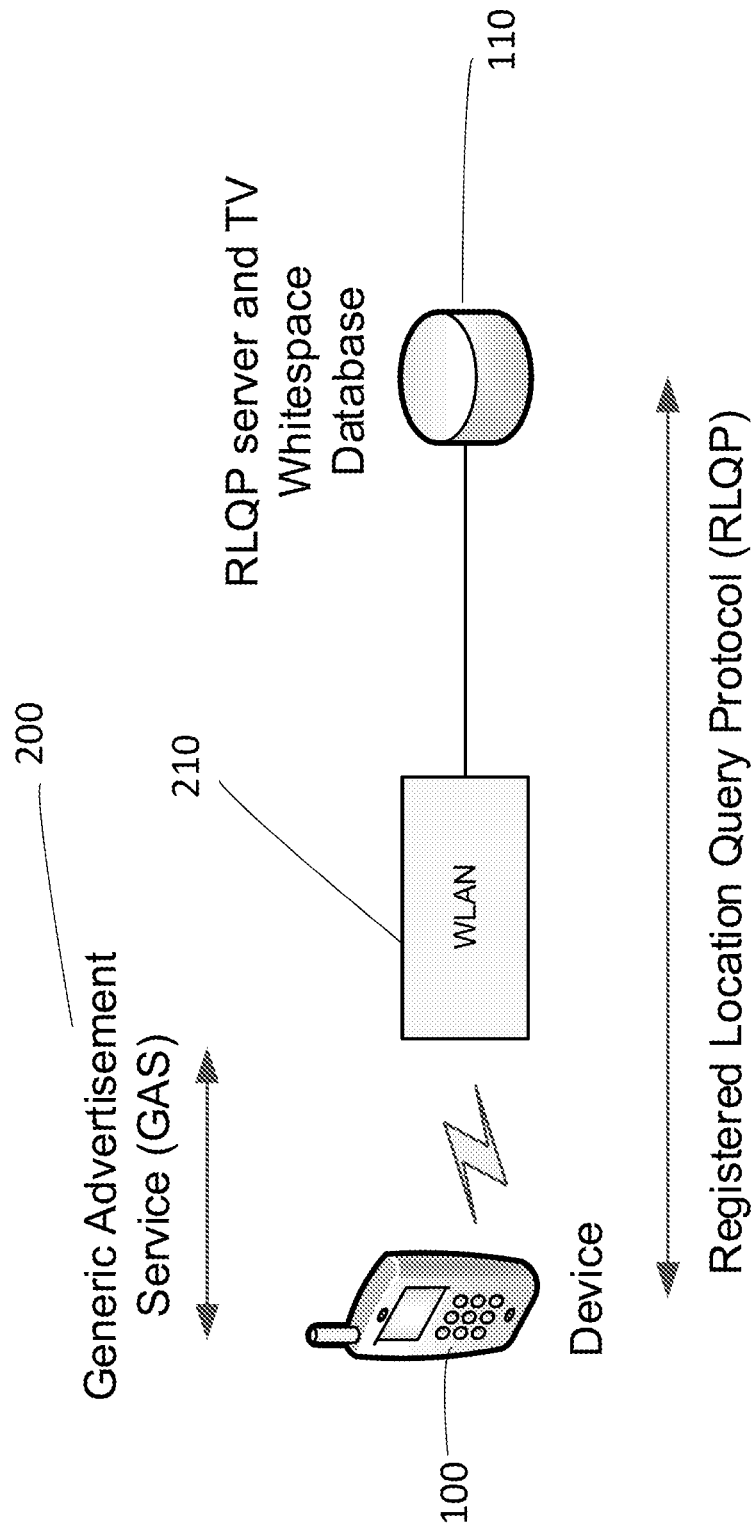
FIG. 2 is network schematic of an architecture that can be used in the context of the present teaching, wherein a database that is conventionally used for allowing temporary use of TV Whitespace is modified to facilitate multi-band channel queries.

Specific enhancements for IEEE 802.11 include procedures regarding the operation of how client devices and APs (or master devices) transmit and receive information about multi-band channels. This is not only for the frame formats, but also in the way that the procedures operate. These are some of the RLQP-elements and also the Public Action frames that are always used as Protected Dual of Public Action frames that are used when the RLQP is not able to operate, for example, when a Generic Advertisement Service, GAS, protocol 200 is not supported in either the client device or a WLAN access point 210, as shown in FIG. 2. Again, in the context of modifying or re-purposing an existing TV White Space architecture for a new application—per the present teaching—this architecture whilst superficially similar is different to known architectures, as will be described in more detail below.

Specifically, per the present teaching it is possible to allow use of these messages for multi-band channel discovery as opposed to the conventional usage in TV whitespace channel discovery. Functional changes are also required to the message protocol between the client device and the AP (or a master device).

The person of skill will appreciate that within the IEEE 802.11 standard, a WSM Type field is conventionally set to a number that identifies the type of WSM information field and the frequency band where the following WSM or MBCM Information field is applicable. As is shown in Table 1 below, the WSM Type field being set to 1 indicates, per conventional understanding, that the WSM Information field of the WSM element contains available frequency information for operation in the TVWS procedure. Per the present teaching, additional fields can be updated to indicate availability of operation in multi-band channels. In the example of Table 1, the WSM Type field set to 2 indicates the Information field of the MBCM element contains available frequency information for operation in multi-band channels.

TABLE 1

| WSM Type definition | |
|---|---|
| Name | WSM Type |
| Reserved | 0 |
| TV band WSM | 1 |
| Multi-band Channel Map | 2 |
| Reserved | 3-255 |

Within the context of this modification of the conventional use of otherwise used TV white space messages, the present inventors have identified at least two specific RLQP-elements that can be enhanced for MBC operation: the Channel Availability Query RLQP-element, and the Network Channel Control RLQP-element.

Channel Availability Query RLQP-Element

This element provides the availability of a channel to a client device. Per the present teaching it is possible to:
1) Create a new message that provides MBC availability (e.g. a multi-band channel map). This message is transmitted by an AP (or a master device) and received by a client device.
2) Create a new message that provides updated channel information when information in the database changes. This message is transmitted by an AP (or a master device) and received by a client device. The message may be an extension to the current contact verification signal (CVS).

Enhancements to Table 9-341 (Reason Result Code Field Values) of the IEEE 802.11 standard are shown below in Table 2 with the new additions shown underlined.

TABLE 2

Reason Result Code Values

| Reason Result Code field value | Name | Description |
|---|---|---|
| 0 | | Reserved. |
| 1 | | Channel availability list requested. |
| 2 | SUCCESS | Success with the available channel list result for a Device Location Information field. |
| 3 | SUCCESS_MULTIPLE | Success with an available channel list result for a bounded geographic area defined by multiple Device Location Information fields. |
| 4 | REFUSED | Request declined. |
| 5 | DEVICE_VERIFICATION_FAILURE | Request not successful because of device identification verification failure. NOTE-Failure of providing an authorized identification of the corresponding regulatory organization can cause the responding device to reject the query and return such a Reason Result Code. |
| 6 | Continuation frame | This frame continues the fields from the previous CAQ frame. |
| 7 | SUCCESS | Success with the available channel list result for a Device Location Information field. |
| 8 | SUCCESS_MULTIPLE | Success with an available channel list result for a bounded geographic area defined by multiple Device Location Information fields. |
| 9-255 | | Reserved. |

The person of skill will appreciate that the Reason Result Code field is used to indicate the reason that a channel availability query was generated. It also indicates the result of the query as successful or not and the reason when the query is not successful. The length of the Reason Result Code field is 1 octet. The Reason Result Code field values that have been allocated to date are Fields 1 to 6. Per the present teaching this table could be updated to include two new fields—in the example of Table 2, fields 7 and 8—which requires the renumbering of the last row to field 9. Per the use of this use of the standard, the MBCM Information field is present only when the Reason Result Code field value is 7 or 8, as the successful result of the query.

Network Channel Control RLQP-Element

Again, this element is conventionally used as part of the IEEE 802.11 standard to allow the control and management of channels. Per the present teaching, enhancements can be made to the procedures which utilise this element to allow MBC operation.

Example changes to the IEEE 802.11 standard include a definition of how this element could be used to indicate availability of another, for example a 6 GHz, channel. When the Channel Availability Query frame contains multiple Device Location Information fields, the MBCM information in the CAQ response is applicable for any location within the bounded area defined by the multiple locations. When the Channel Availability Query frame contains two Device Location Information fields, the MBCM information in the CAQ response is applicable for any location within the bounded area determined by the uncertainty values of the coordinates of the second Device Location Information field. If no common channels are available to the bounded geographic area defined by multiple locations, the CAQ responding device (e.g. the master device) responds with Reason Result Code field set to 7 (Success with the available channel list result for Device Location Information field) and MBCM information applicable to the first Device Location Information field in the Channel Availability Query frame. If one or more common channels are available to the bounded geographic area defined by multiple locations, the CAQ responding device responds with Reason Result Code field set to 8 (Success with an available channel list result for a bounded geographic area defined by multiple Device Location Information fields) and a corresponding MBCM Information field.

New Advertisement Messages

An alternative solution, but again within the context of existing protocols for TV white space operation, is to create a new advertisement protocol specifically for multi-band channel discovery, for example a Multi-band Channel Query Protocol (MBCQP).

Figure 3:
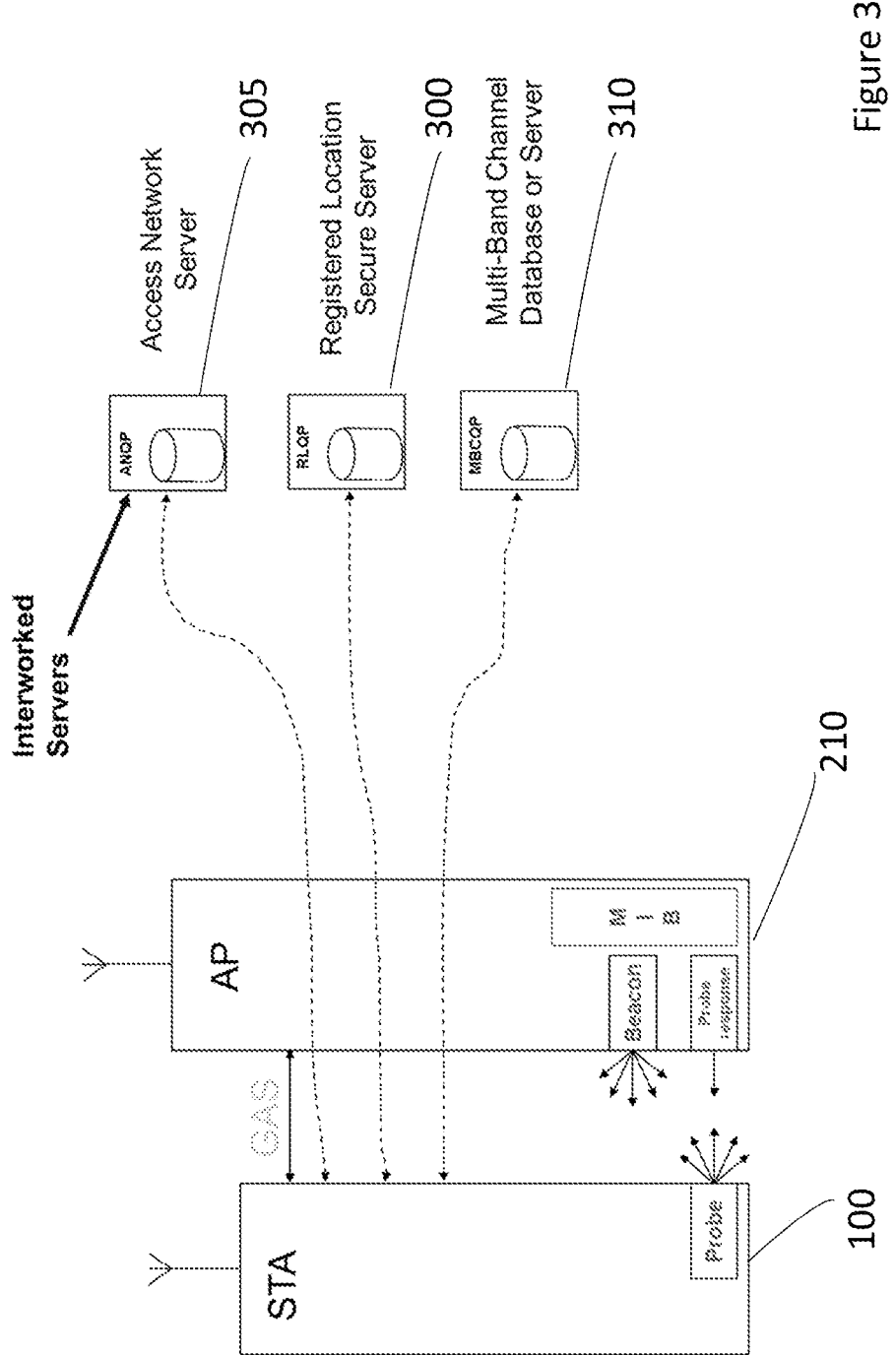
FIG. 3 is network schematic of an architecture that can be used in the context of the present teaching to facilitate multi-band channel queries.

The operation of the messages could be the same as that outlined above, but not based on existing messages. On reason for adopting this approach within the IEEE 802.11 standard, is that such queries could be directed to a new MBC Database 310 or Server as shown in FIG. 3, avoiding the re-use of a legacy Registered Location Secure Server (RLSS) 300 or Access Network Server 305 as conventionally used for TV whitespace operation.

Figure 4:
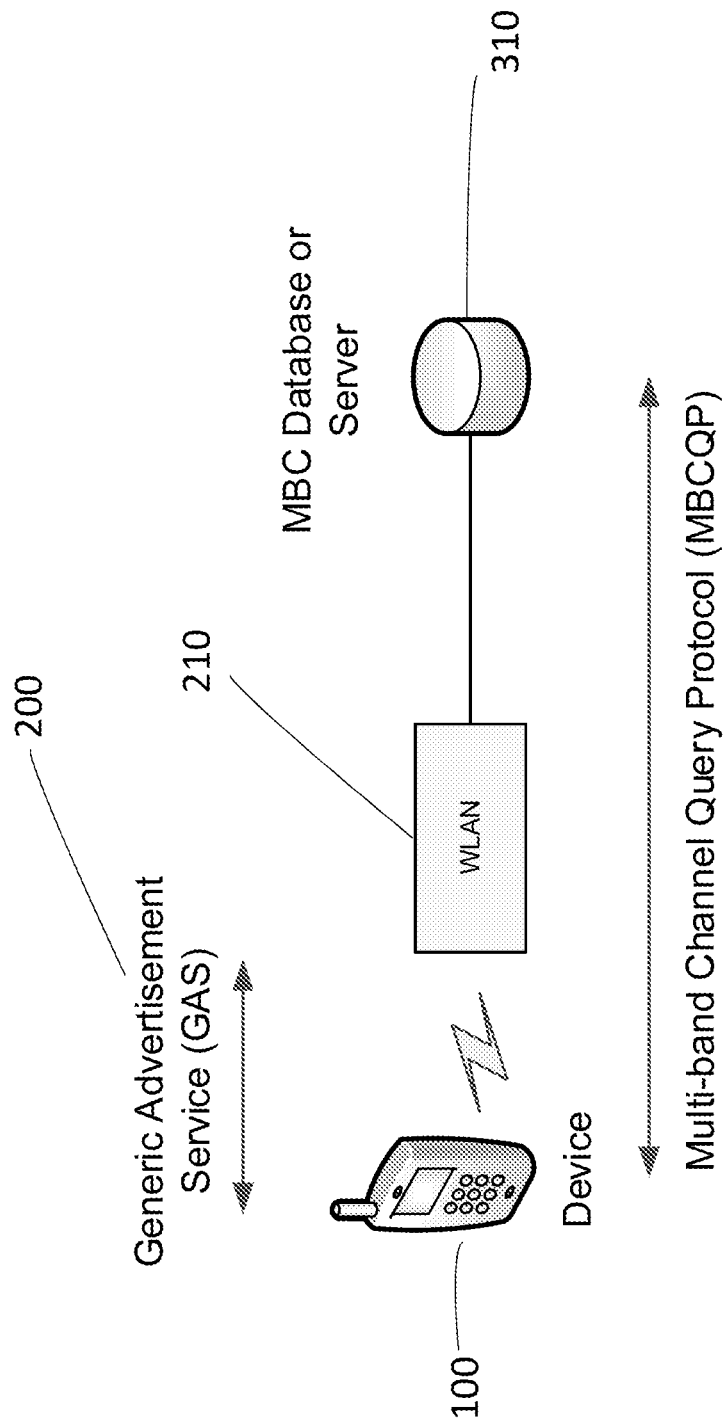
FIG. 4 is network schematic of an architecture that can be used in the context of the present teaching to facilitate multi-band channel queries.

FIG. 4 shows in schematic form how a new MBCQP-element 400 is created to carry request and response information within the MBCQP, to and from an MBS Database or Server 310. The similarity in architecture to that of the communications that happen conventional per TV White Space standards—see FIG. 2 for example—should not be conflated with the approach of the present teaching being an obvious modification of that existing architecture. To identify that such an existing architecture could be modified to provide multi-band communication channel possibilities was not evident before the present teaching.

It will be appreciated that when GAS is not available in either the client device or the master device, a MBCC Protected Dual of Action Frame can be used to carry the request and response information. It will be understood that public action frame is a fundamental IEEE 802.11 frame that can be passed between two devices (e.g. a client and master device) without any previous trust or other relationship having been established. A Protected Dual of Public Action Frame applies a basic level of protection to public action frames, so that a receiving device (e.g. a client device) can trust the integrity of the content of the public action frame from the transmitting device (e.g. a master device). As these Protected Dual of Public Action Frames are encapsulated within management frames that carry the MAC address and other parameters of the transmitting device (mobile device or AP), the receiving device can determine the identity of the transmitting device.

ANQP Option

Figure 5:
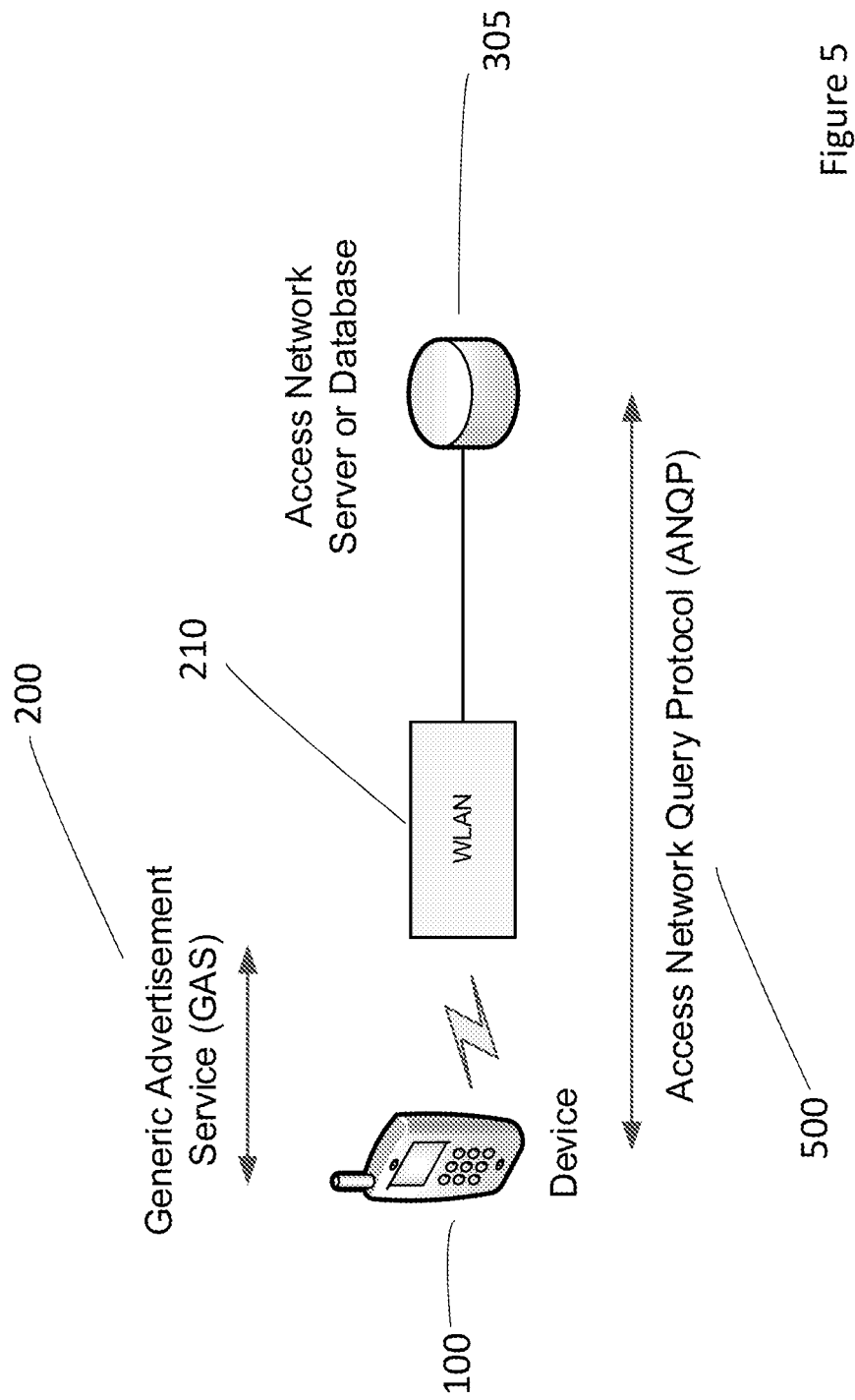
FIG. 5 is network schematic of an architecture that can be used in the context of the present teaching to facilitate multi-band channel queries.

A further alternative is that a new ANQP-element is defined, so that MBC requests and responses can be transported to an existing Access Network Server 305, as shown in FIG. 5. This approach allows an existing Access Network Server to be extended to operate as an MBC Server or Database and removes the requirement for a separate MBC Server or Database.

Figure 6:
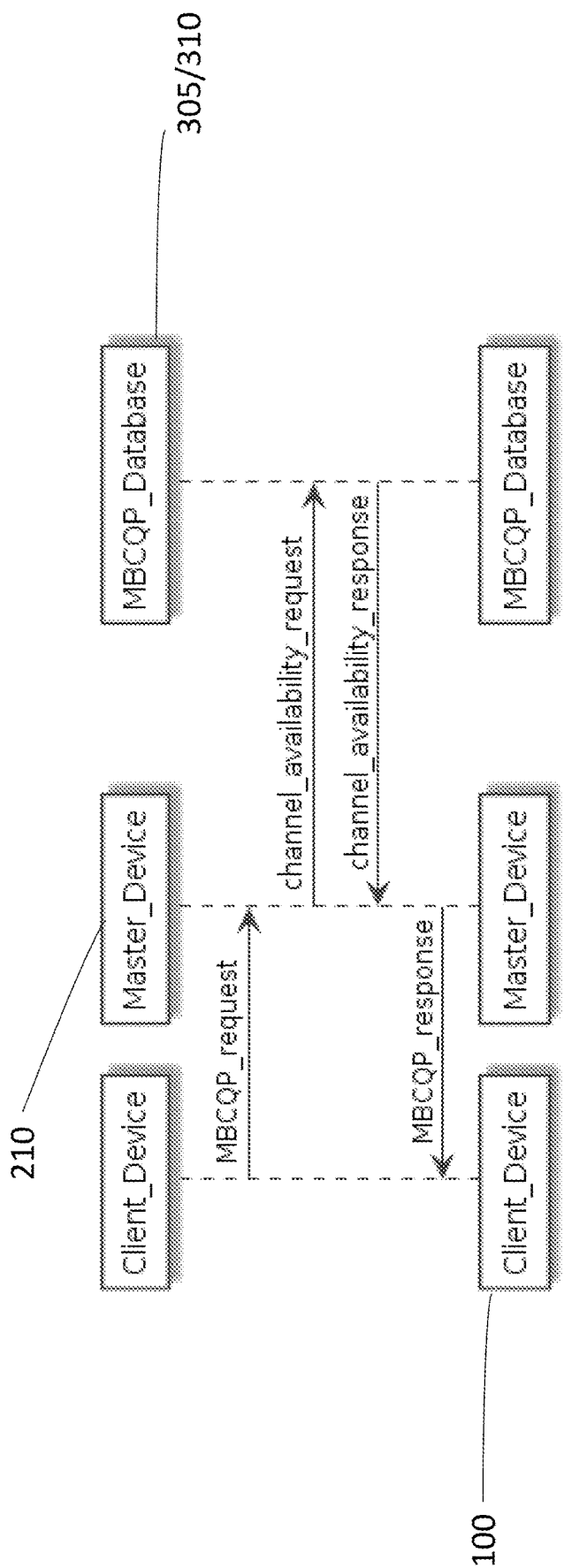
FIG. 6 is schematic communication flow that enables determination of secondary communication channel selection by a device in accordance with the present teaching.

An example of the communications can be conducted between the client device 100, the WLAN or master device 210, and the networked databases—be those repurposed access network databases 305 or dedicated MBC databases 310 is shown in FIG. 6. Using a first communication channel within a wireless network, the method comprising the wireless client device 100 determining that a new communication channel is required and on determining such is required, communication channel, or simply effecting communication on two channels simultaneously.

FIG. 6 references a Multi-Band Channel Query Protocol (MBCQP) element. The format of this element will be described below but it is intended, per the present teaching that the MBCQP normally operates in an unprotected manner (i.e. insecure) between the client device and the master device. MBCQP can also operate in a protected manner by using a Protected Dual of Public Action GAS frame. One advantage of this approach is that this MBCQP-elements could be forwarded to an alternative database/server from that of RLSS. This may be advantageous for the AFC model, where there is no concept of an existing RLSS.

An alternative solution is to use a dedicated RLQP-element, which specifically requests information about MBC channels, as opposed to an MBCQP. Such an RLQP-element can use existing IEEE 802.11 RLQP protocols. Within the RLQP request, it may be necessary to transmit the device identity and location. It could also either secure or insecure. The advantage of this approach is that this RLQP-element would then re-use an existing RLSS connected to (or co-located with) the WLAN.

A further alternative solution is to create a new ANQP-element, which specifically requests information about MBC channels. This ANQP-element can use existing ANQP as defined in IEEE 802.11. Within the ANQP request, it may be necessary to transmit the device identify and location. It could also either secure or insecure. An advantage of this approach is that these ANQP-elements would then re-use an existing ANQP server connected to (or co-located with) the WLAN. This may be advantageous for the AFC model being adopted by the Wi-Fi Alliance.

Irrespective of the nomenclature use, any of these MBCQP or RLQP or ANQP-elements can, per the present teaching, be used to request multi-band channel requests and provide responses using the GAS protocol. The elements can adopt a format such as that shown below in Table 3

TABLE 3

Multi-Band Channel element format

| Info ID | Length | Requester Device Address | Responder Device Address | Reason Result Code | Number of Multi-Band Channel Control Triplets | Operating Class | Channel Number | Maximum Transmit Power: |
|---|---|---|---|---|---|---|---|---|
| 2 | 2 | 6 | 6 | 1 | 1 Octets | 1 | 1 | 1 | the client device 100 sends a MBCQP request to its connected to AP or master device 210 on the first communication channel. This triggers the interrogation by the master device or a channel availability request message to the networked database 305/310. On receiving a response, that response is then relayed or otherwise communicated back from the master device 210 to the client device 100.

It will be appreciated that having received confirmation that there is an available second communication channels available for the location within which the wireless client device 100 is located, the client device can initiate a request to connect to the second communication channel. This can further trigger, although not show in FIG. 6, on receiving confirmation that the request to connect is granted, switching from the first communication channel to the second Within the above Table 3, the RequesterDeviceAddress field is the MAC address of the requesting client device that initiates the multi-band channel control process. The ResponderDeviceAddress field is the MAC address of the master device (or otherwise referred to AP) that responds to the client device that requested multi-band channel control. The Reason Result Code field is used to indicate the reason that a multi-band channel control response was generated. The length of the Reason Result Code field is 1 octet. The encoding of the Reason Result Code field can be implemented in a manner such as that shown below in Table 4—Multi-Band Channel Reason Result Code field values, where it will be appreciated that certain of the identified codes may share similarities with codes that are already used within the IEEE 802.11 standards.

TABLE 4

Multi-band Channel Reason Result Code field values

| Reason Result Code field value | Name | Description |
|---|---|---|
| 0 | REQUEST | Multi-Band channel request. |
| 1 | SUCCESS | Success. |
| 2 | REFUSED | Request declined. |
| 3 | TOO_MANY_SIMULTANEOUS_REQUESTS | Multi-Band channel request denied because the master device is unable to handle additional client devices. |
| 4 | Continuation frame | This frame continues the fields from the previous Multi-Band Channel Control frame. |
| 5-255 | | Reserved. |

The Number of Multi-Band Channel Control Triplets field indicates the number of triplets of Operating Class, Channel Number, and Transmit Power Constraint fields. The Operating Class field indicates the channel set for which the multi-band channel control request applies. The Operating Class field and Channel Number field are used together to specify the channel frequency and channel bandwidth for which the multi-band channel control applies. Values for the Operating Class field are based on country information and operating classes.

In a request, the Channel Number field of a Multi-Band Channel Control RLQP-element indicates the channel that the requesting device (e.g. the client device) intends to operate on. In a response, the Channel Number field in the Multi-Band Channel Control RLQP-element indicates the channels that a master device (or an AP) permits the client device to operate on. The Channel Number is defined within an Operating Class based on country information and operating classes.

The Maximum Transmit Power field gives the intended maximum transmit power in dBm for operation in the request frame and indicates the maximum allowable transmit power in dBm for operation in the response frame. The field is coded as a 2 s complement signed integer in units of 0.5 dBm. The field is set to p31 128 when a requesting client device requests a master device (or an AP) to provide a multi-band channel control response without specifying in the request the intended maximum transmit power.

The above examples are based on extensions to existing message and protocols. In some regulatory environments a new message request for channel operational information covering multi-band channels would need to preserve privacy of the user/device or prevent tracking of the device. This can be implemented in accordance with the present teaching using a secured advertisement information approach.

Solution #2: Secured Advertisement Information

In order to preserve privacy of the user/device or prevent tracking of the device, the present teaching provides certain embodiments which enable a removal of protocol elements that identify the device (e.g. the MAC address). This can be done by, for example, randomizing the MAC address and removing any device specific information in network discovery. In addition to this preservation of privacy of the user/device, certain environments may also require Integrity protection of the request/response Preservation of data confidentiality of the transaction These are new items which have not been considered before within IEEE 802.11 TV whitespace operation. Per the present teaching, sub-fields can be added to the messages previously described to provide the extra security and privacy that is required.

Figure 7:
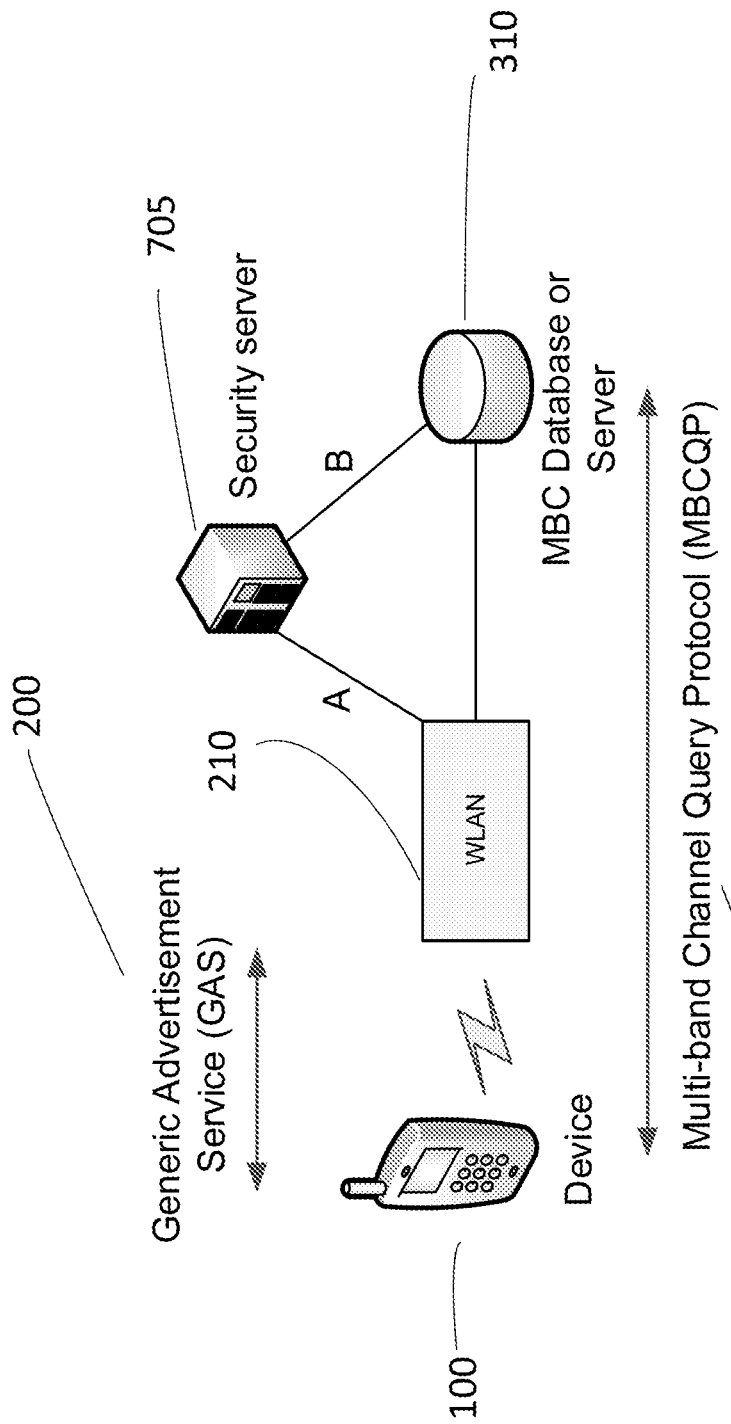
FIG. 7 is network schematic of an architecture similar to that of FIG. 5 but modified for enhanced security of communications.

In accordance with the present teaching, and as will be exemplified with reference to FIG. 7, which shows a modification of the architecture of FIG. 5 to incorporate a security server 705 it is envisaged that security can be enhanced through the following mechanism.

A client device 100 goes online to register (in an out of band manner) and receives a credential or simply a public key for the database 305 provider. The client device generates key and encrypts request 700. The database 305, or a separate security server 705 as shown in FIG. 7, processes a request and encrypts a response 700. This response could be implemented for example using an IEEE 802.11 authentication frame to provide frame encapsulation/encryption on the transaction.

The database 305 (or separate security server 705) server encrypts the response and transmits it as a unicast frame back to the device 100. It will be appreciated that the encryption of communications outgoing from the client device 100 may be effected on a more generic than per communication level. For example, the client device may encrypt all outgoing communications and the database server 310 is then required to have knowledge of, for example, the public key of the client device to decrypt those incoming requests.

It will be appreciated that if there are multiple simultaneous requests from multiple client devices, the database 305/705 may send a single response by transmitting the response as a group-addressed frame. For example, if the database 305/705 receives 10 requests in 1 second that require the same response, the messaging can be modified from a direct message back to each client to a broadcast message to all clients.

It will be appreciated that FIG. 7 shows a communication path from each of the WLAN (serving as AP or master device) 210 to the security server 705—path A; and a communication path from the database 305 to the security server 705—path B. It will be understood that the both paths A and B may exist, or only path A or path B, i.e. communications with the security server may use multiple network nodes or not.

It will be appreciated that the reference to the dedicated MBC server 310 within the context of FIG. 7 should not be construed as limiting the application of security features such as these described to an architecture that requires use of a dedicated MBC server and that a security infrastructure could equally be implemented in architectures that make use of access network servers 305 or registered location secure servers 300 as described above.

The above examples of this labelled Solution #2 are based on providing enhanced security. The labelled Solution #1 was based on using extensions to existing message and protocols. Both were exemplified within the context of what is commonly known as TV white spaces and demonstrated how a second communication channel or band that is commonly associated with a primary user or usage can be used, within the context of the present teaching, by a secondary user. It will be appreciated within a specific band, primary users of the band may appear and disappear in an unpredictable manner. TV white space channels are predictable and may only require channel usage updates every 24 hours or so. This will not be the case for other bands. To address this, the present teaching provides, in certain aspects, for a responding device (e.g. an AP or a master device) to message any requesting devices (e.g. clients) about changes to the multi-band channel map on a regular basis in the form of Multi-band channel update messages.

Solution #3: Multi-Band Channel Update Messages

To facilitate an updating of client devices that are connected to a secondary band that is no longer available, the present teaching provides a number of possible communications that can be implemented. For example, a master device, the device that originally facilitated the connection to the secondary band can be configured for:

Setting a bit in a beacon/probe response informing client devices that they need to update their channel availability request.

Sending out a Contact Verification Signal (CVS) message. It will be appreciated that CVS messages are already known in the context of White Space Mapping, WSM, for TV white space applications. Similarly to how a conventional client device receives a CVS frame transmitted from its master device or AP that provided the WSM, the present teaching can extend that usage of CVS messages to update on availability of MBCMs so as to verify that it is within reception range of that master device (or AP). By modifying a conventional CVS frame such that it has a Map ID field that indicates whether either the WSM or MBCM has been changed, it is possible for a client device to compare values of the Map ID field in the CVS frame with the Map ID of its existing WSM or MBCM. If they are the same, then the client device assumes that its WSM or MBCM is valid, and it sets the enablement validity timer equal to dot11ContactVerificationSignalInterval. If they are different, the WSM or MBCM is invalid because the WSM or MBCM information has changed. The client device should transmit a Channel Availability Query frame and receive a response in a Channel Availability Query frame that contains an updated WSM or MBCM. If the client device fails to retrieve the updated WSM or MBCM, it shall change its enablement state to unenabled and stop transmitting over the air after the enablement validity timer has expired.

The master device (or AP) should Inform client devices to change channel either immediately or in a specific time frame. Alternatively, the master device (or AP) can change its channel and then expect client devices to determine the new channel and move themselves.

Solution #4: Multi-Band Channel Broadcast Messages

Heretofore, we have discussed how a client device operating within a network architecture may prompt for information regarding availability of alternative secondary communication channels. In a modification to that previously described, but similarly to Solution #3, the present teaching may provide an arrangement where a network broadcast message is periodically transmitted to advise client devices operating within a specific geographical area of the existence of alternative communication channels for usage. These broadcast messages could be sent on the channel that the client device is already using. In such an arrangement, the client device may be configured to maintain a local refreshable database that includes data fields that can be updated to reflect availability of alternative communication channels on a temporary basis. An example of such a data structure is provided below in Table 5.

TABLE 5

| Channel ID | Geolocation | Available (Y/N) |
| --- | --- | --- |
| ID1 | Geo1 | Y |
| ID2 | Geo2 | N |
| ID3 | Geo3 | N |
| ID4 | Geo4 | N |

In this way, having identified the need for an alternative channel, the client device would first interrogate a local database or store to identify whether alternative channels are available, before proceeding with initiating network communication requests. In the example of Table 5, if the device is operating in a first geolocation—Geo1—interrogation of the data structure will return a result that channel ID1 is available for connection requests. However, if the device were operating in a second geolocation—Geo2—then the interrogation would return a result that channel ID2 is not available. It will be appreciated that the provision of this local refreshable database will typically require a reconfiguration of the client device to define such a database on the device. This could be done at factory install or through over the air updates provided to the client device as part of enhancing the functionality of already deployed client devices.

The above describes how protocols that were traditionally developed for temporary secondary use of TV white space have been identified by the present inventor as a basis for facilitating more generally use of an alternative communication channel by a client device that is currently operating within a network using a first communication channel. For example, there is currently no suitable solution for an IEEE 802.11 device that is using messages and protocols over the IEEE 802.11 air interface (e.g. 2.4 or 5 GHz bands) to simply determine an alternative band, for example 6 GHz channel availability.

Figures 8, 9:
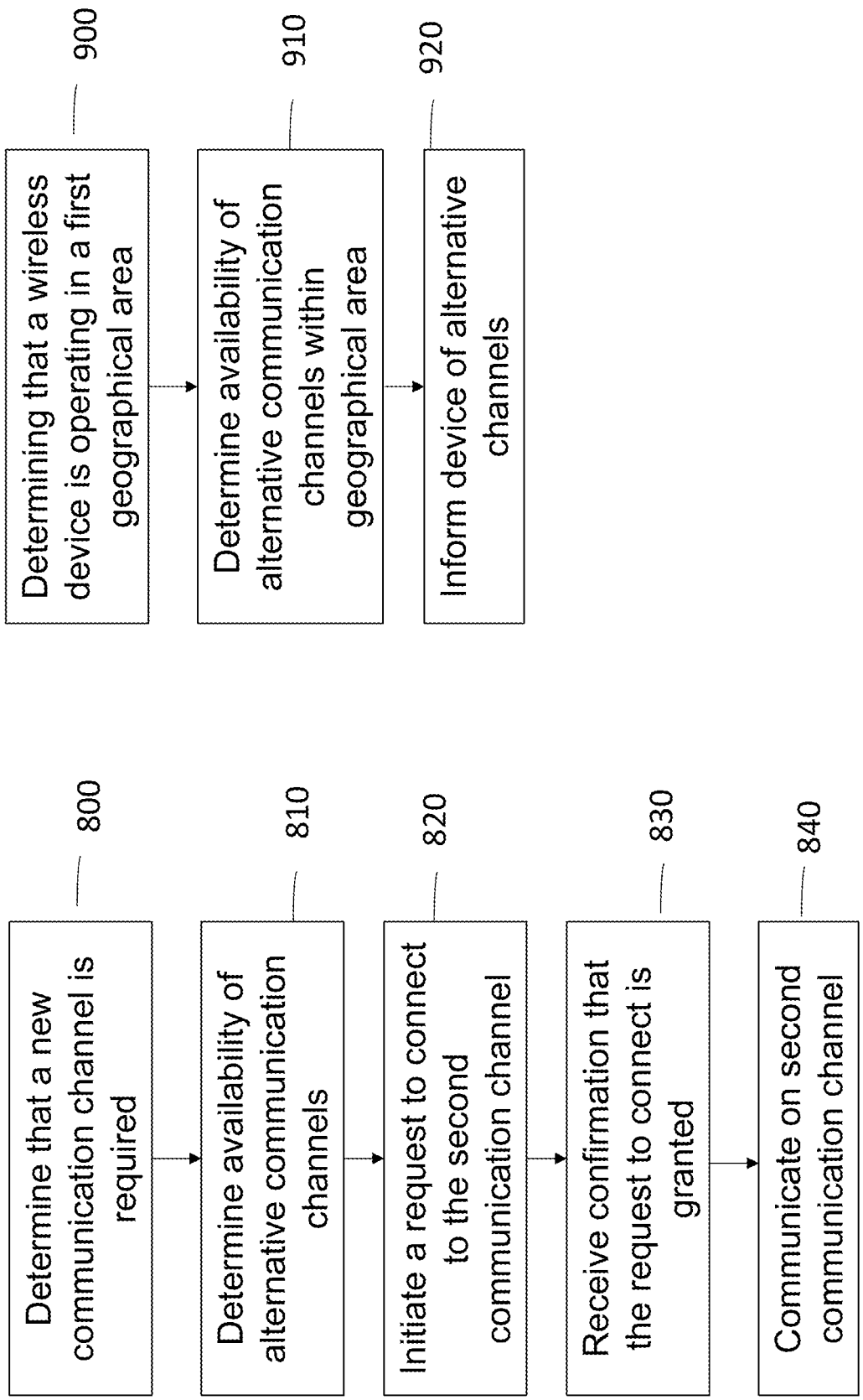
FIG. 8 is a process flow from the context of a device operating in accordance with the present teaching.
FIG. 9 is a process flow from the context of a network node operating in accordance with the present teaching.

The specification heretofore has referenced specific IEEE 802.11 protocols and elements. In FIG. 8 we confirm that these specifics were provided as examples of how the present teaching can be implemented into communication networks. FIG. 8 demonstrates in a more generic fashion a method, in accordance with the present teaching, that may be implemented at a wireless device operating using a first communication channel within a wireless network of determining availability of alternative communication channels for use by the wireless device.

The method comprises the wireless device initially determining that a new communication channel is required (800). This determination is typically by comparing a first connectivity characteristic against a threshold for that first connectivity characteristic. For example, if a wireless device is communicating in a network environment using one of a wireless local area network, WLAN, communication channel or a channel defined within one of the 2.4 GHz or 5 GHz license-exempt bands, it may determine that the network speeds have degraded on that communication channel. This can be caused for a variety of reasons—for example signal strength, other devices using the same communication channel etc.

Per the present teaching this first connectivity characteristic can be based on a performance characteristic of an application executing on the wireless device. For example, if the wireless device is a smartphone it may have browser applications installed on the device. A browser is in this context an example of an executable program that runs on the smartphone that uses the application layer protocols—the person of skill will understand this to be a reference to a layer within the Open Systems Interconnection (OSI) communications model. The device can be configured to check connectivity characteristics of the of the browser traffic. When the browser traffic falls below a threshold minimum value, this can be used as a trigger to look for alternative communication channels for use by the device. In this way the browser traffic metric is an example of an application layer connectivity characteristic.

Having determined a need for an alternative communication channel, the present teaching then provides a determination of availability of alternative communication channels, Step 810.

This availability of alternative communication channels can comprise initiating a query at a network node of availability of alternative communication channels—as for example was described above using an MBCQP element. As the present teaching envisages use of secondary channels that are otherwise used by primary users—and whose usage is restricted (for example the 6 GHz band)—the availability will typically be done using a database look up, such as was described above using the databases 300, 305, 310. As explained above, these types of databases are remote to the initiating wireless device 100 and include location specific information about availability of communication channels for specific geographic locations.

In another configuration, the determining availability of alternative communication channels (Step 810) comprises receiving information in a broadcast communication from a network node. As was described above with reference to FIG. 1, a client device 100 may periodically receive a new message from a database 110, without any query having been sent. The message can be broadcast by the database 110 (or by either a local master device or an access point, AP, 130) on a periodic basis (or when either a master device or an AP determines that enough demand of channel information requires a broadcast transmission).

The query to the remote database can a direct query by the wireless device, or can be an indirect query originating at the wireless device and passing through one or more intermediate network nodes—such as WLAN access nodes in the event that the device is currently communicating using a WLAN communication channel.

Having determined (Step 810) on determining that there is an available second communication channels available for the location within which the wireless device is located, the device can then initiate a request to connect to the second communication channel (Step 820). It will be appreciated that initiating a request to connect does not guarantee that the request will be granted as second communication channel may be available but may, for other reasons, elect to reject any new connection requests.

However, if the request to communicate is granted (Step 830), the present teaching provides the wireless device switching either from the first communication channel to the second communication channel (Step 840) or continuing to communicate on both the first and second communication channels—ie routing some communication traffic through each of the first and second channels. Such use of two communication channels simultaneously could be used, for example, in times of congested bandwidth. The second communication is in this example used to supplement the available bandwidth that is provided to the client device using the first communication channel. It will be appreciated that this could be particularly advantageous in the context of streaming high definition video or the like.

Whilst the first communication channel is typically envisaged as being a cellular network channel such as those provided by the 2.4 GHz or 5 GHz bands, and the second communication channel is a restricted band in for example the 6 GHz band, it will be understood that the second communication channel could also be a wireless local area network, WLAN, communication channel.

As was described above with reference to the Solution #3, certain implementations may be implemented cognizant of privacy concerns and in this way the method of FIG. 8 may include initiating the query to the remote database whilst at the same time masking an identity of the wireless device.

FIG. 8 describes a process flow as seen from the perspective of the wireless device. The present teaching also provides a method executing at a network node of informing a wireless device operating using a first communication channel within a wireless network of availability of alternative communication channels for use by the wireless device.

FIG. 9 shows an exemplary process flow from the perspective of the network node and comprises the network node determining that a wireless device is operating in a first geographical area—Step 900.

Having made that determination, the node can then initiate a database query of availability of alternative communication channels within the first geographical area—Step 910. Table 6 below shows an example of a data structure that could be maintained at the network node:

TABLE 6

| Channel ID | Geolocation | Available Date Range | Available Time Range |
|---|---|---|---|
| ID1 | Geo1 | Date xx-yy | Time 1-Time 2 |
| ID2 | Geo2 | Date xx-yy | Time 3-Time 4 |
| ID3 | Geo3 | Date aa-bb | Time 1-Time 2 |
| ID4 | Geo4 | Date cc-dd | |

It will be appreciated that one or more of the restricted access channels may have overlapping times and dates when they are available for use by secondary users. Other channels may not overlap at all. For example, each of ID1 and ID2 are available for the dates "Date xx-yy", but ID1 is only available between Time1-Time2, whereas ID2 is available between Time3-Time4. If the available date and/or time range is not defined—for example in ID4, Geo4 above where the time field is blank—then it can be assumed that that Channel is always available for selection request purposes. A database lookup for a wireless device that is located in Geo4 will then return a response that that channel ID4 is available for the device to request connection to—irrespective of the time and/or date of the request. It will be appreciated from this example, that either the time or date fields can be configured to have priority over the other—for example an empty time field can indicate that the channel is always available irrespective of the data in the date field. Modifications to the configuration can be made.

On identifying that a second communication channel within the first geographical area exists, the node can then inform the wireless device that there is an available second communication channels available for the location within which the wireless device is located—Step 920. It will be appreciated that this informing can be done in response to a direct query from devices that wish to change to that second communication channel or can be effected through a broadcast message to inform devices that may wish in sometime in the future to change to that second communication channel. In that event, the broadcast message may include time and date information about availability in the future. This information could then be stored within a database stored locally on the wireless device-such as one adopting a format exemplified in that of Table 5 above.

In either scenario, on retrieving information provided from a network node of availability of alternative communication channels, and specifically on retrieving information that there is an available second communication channel available for the geographic location within which the wireless device is located, the wireless device can then initiate its own request to communicate on that second channel. That request could be accepted, in which case the wireless device could use that second channel within the constraints of permitted usage for that channel. In the event that the request is not accepted, the wireless device could re-request at some time in the future, or the wireless device could simply just continue communicating on the first communication channel which it is already using.

It will be appreciated that what has been described herein are exemplary methods within a network of facilitating identification and usage of alternative communication channels by a wireless device operating using a first communication channel. The present teaching enables use of as secondary channel by non-primary users of that channel for prescribed times and within prescribed geographic locations.

Various tasks discussed herein can be performed by a hardware processing circuit or a combination of a hardware processing circuit and machine-readable instructions executable on the hardware processing circuit. The hardware processing circuit can be part of a device such as a UE, a network node, and so forth. A hardware processing circuit can include a processor, such as any or some combination of a microprocessor, a core of a multi-core microprocessor, a microcontroller, a programmable integrated circuit, a programmable gate array, or another hardware processing circuit.

Machine-readable instructions executable on a processor can refer to the instructions executable on a single processor or the instructions executable on multiple processors.

A processor performing a task can refer to a single processor performing the task or multiple processors performing the task.

Machine-readable instructions can be stored in non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. In this context, it will be understood that a method within a network of facilitating identification and usage of alternative communication channels by a wireless device operating using a first communication channel is described. The method enables use of as secondary channel by non-primary users of that channel for prescribed times and within prescribed geographic locations. However, implementations may be practiced without some of these details. Other implementations may include modifications and variations from the details discussed above. It is intended that the appended claims cover such modifications and variations.

The scope of the claims should not be limited by the preferred examples set forth above but should be given the broadest interpretation consistent with the description as a whole.

In addition, the present teaching may be extended to the features of one or more of the following numbered clauses:

What is claimed is:

1. A wireless device comprising:
   a communication interface to communicate using a first communication channel within a wireless network;
   a processor; and
   a non-transitory storage medium storing instructions executable on the processor to:
      determine whether a new communication channel is required;
      in response to determining that the new communication channel is required, retrieve information provided from a network node of availability of alternative communication channels for the wireless device; and
      in response to retrieving information that a second communication channel is available for a location within which the wireless device is located, remove wireless device specific information and initiate a request to connect to the second communication channel, wherein the second communication channel is in a frequency range different from a frequency range of the first communication channel.

2. The wireless device of claim 1, wherein the instructions are executable on the processor to:
   in response to receiving a confirmation that the request to connect is granted, switch, by the wireless device, from the first communication channel to the second communication channel.

3. The wireless device of claim 1, wherein the first communication channel is a cellular network communication channel or a wireless local area network (WLAN) communication channel within one of a 2.4 gigahertz (GHz) band or a 5 GHz band.

4. The wireless device of claim 1, wherein the second communication channel is within a 6 GHz band.

5. The wireless device of claim 1, wherein the determining that the new communication channel is required comprises comparing a first connectivity characteristic against a threshold for the first connectivity characteristic.

6. The wireless device of claim 5, wherein the first connectivity characteristic is based on a performance characteristic of an application executing on the wireless device.

7. The wireless device of claim 1, wherein the retrieving of the information provided from the network node comprises initiating a query at the network node of the availability of the alternative communication channels.

8. The wireless device of claim 7, wherein the initiating of the query at the network node of the availability of the alternative communication channels comprises sending a query to a remote database, the remote database having location specific information about availability of communication channels for respective geographic locations.

9. The wireless device of claim 8, wherein the query to the remote database is an indirect query originated at the wireless device.

10. The wireless device of claim 1, wherein the retrieving of the information provided from the network node comprises receiving information in a broadcast communication from the network node.

11. The wireless device of claim 1, wherein the removing of the wireless device specific information comprises randomizing a media access control (MAC) address of the wireless device.

12. A method at a wireless device operating using a first communication channel within a wireless network, the method comprising:
  determining, by the wireless device, whether a new communication channel is required;
  in response to determining that the new communication channel is required, retrieving, by the wireless device, information provided from a network node of availability of alternative communication channels for the wireless device; and
  in response to retrieving information that a second communication channel is available for a location within which the wireless device is located, removing, at the wireless device, wireless device specific information and initiating, by the wireless device, a request to connect to the second communication channel, wherein the second communication channel is in a frequency range different from a frequency range of the first communication channel.

13. The method of claim 12, comprising:
  in response to receiving confirmation that the request to connect is granted, switching, by the wireless device, from the first communication channel to the second communication channel.

14. The method of claim 13, wherein the first communication channel is a cellular network communication channel or a wireless local area network (WLAN) communication channel within one of a 2.4 gigahertz (GHz) band or a 5 GHz band.

15. The method of claim 13, wherein the second communication channel is within a 6 GHz band.

16. The method of claim 12, wherein the determining that the new communication channel is required comprises comparing a first connectivity characteristic against a threshold for the first connectivity characteristic.

17. The method of claim 16, wherein the first connectivity characteristic is based on a performance characteristic of an application executing on the wireless device.

18. The method of claim 12, wherein the retrieving of the information provided from the network node comprises initiating a query at the network node of the availability of the alternative communication channels.

19. The method of claim 12, wherein the retrieving of the information provided from the network node comprises receiving information in a broadcast communication from a network node.

20. The method of claim 12, wherein the removing of the wireless device specific information comprises randomizing a media access control (MAC) address of the wireless device.

* * * * *